Jan. 3, 1961   R. G. TAYLOR, JR   2,966,690
PERIPHERALLY STIFFENED PIPE WIPER
Filed Jan. 17, 1956   4 Sheets-Sheet 1
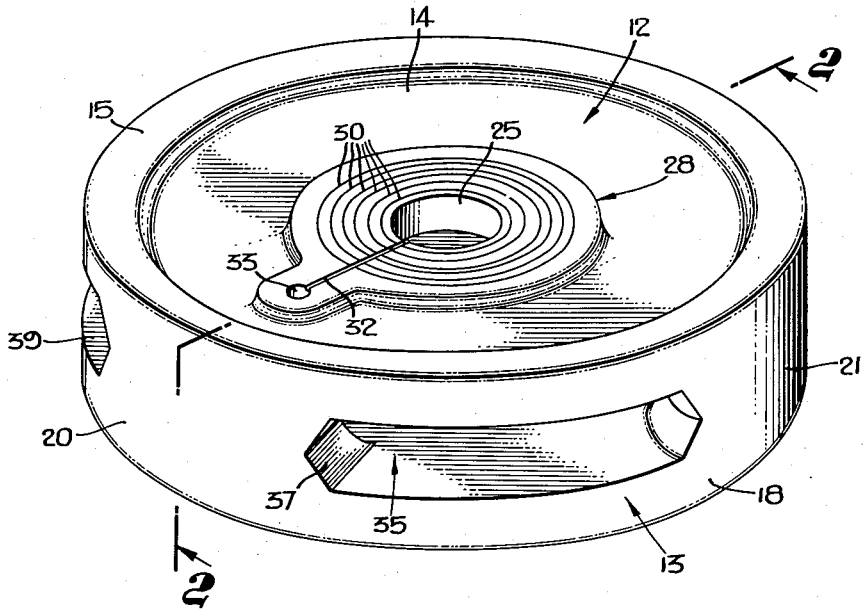
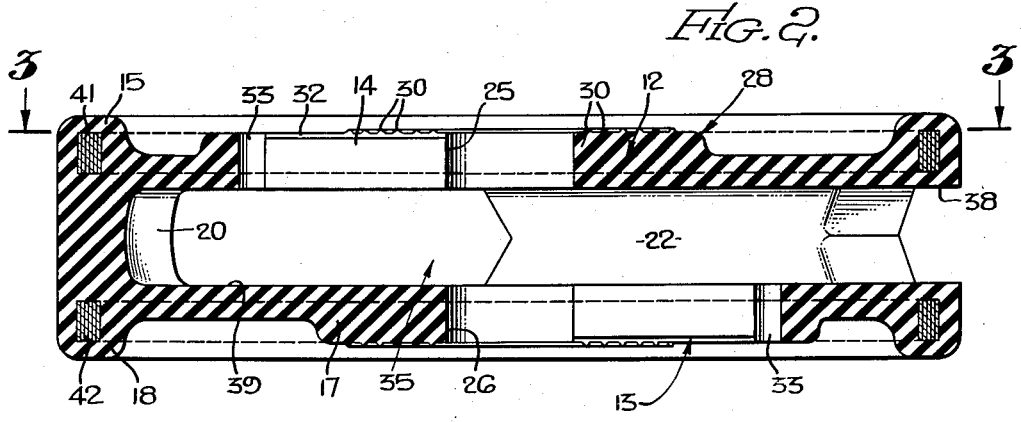
RAYMOND G. TAYLOR, JR.
INVENTOR.
BY
Allen E. Hambly
ATTORNEY Jan. 3, 1961  R. G. TAYLOR, JR  2,966,690
PERIPHERALLY STIFFENED PIPE WIPER
Filed Jan. 17, 1956  4 Sheets-Sheet 2

RAYMOND G. TAYLOR, JR.
INVENTOR.

BY
Allen E. Hambly
ATTORNEY

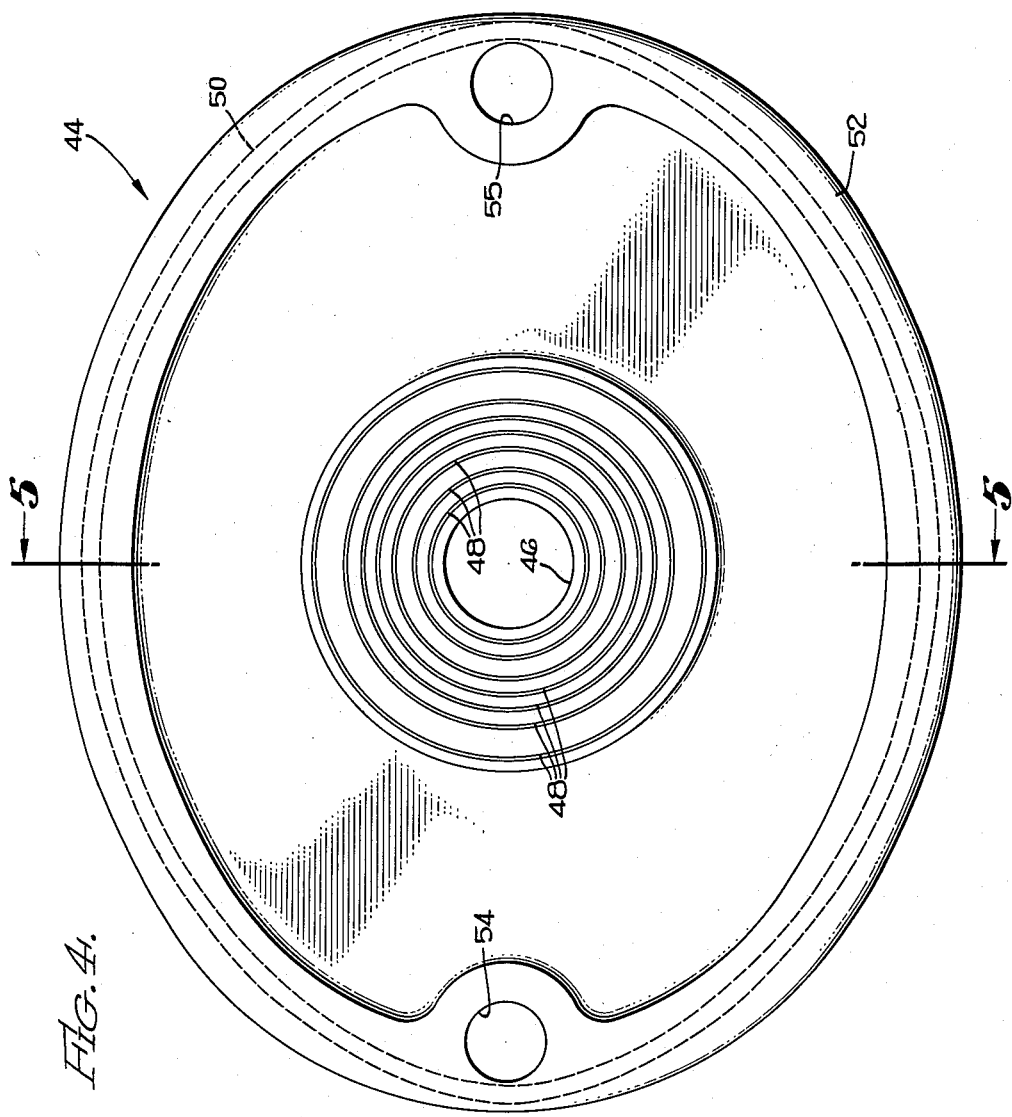

Jan. 3, 1961 R. G. TAYLOR, JR 2,966,690
PERIPHERALLY STIFFENED PIPE WIPER
Filed Jan. 17, 1956 4 Sheets-Sheet 4
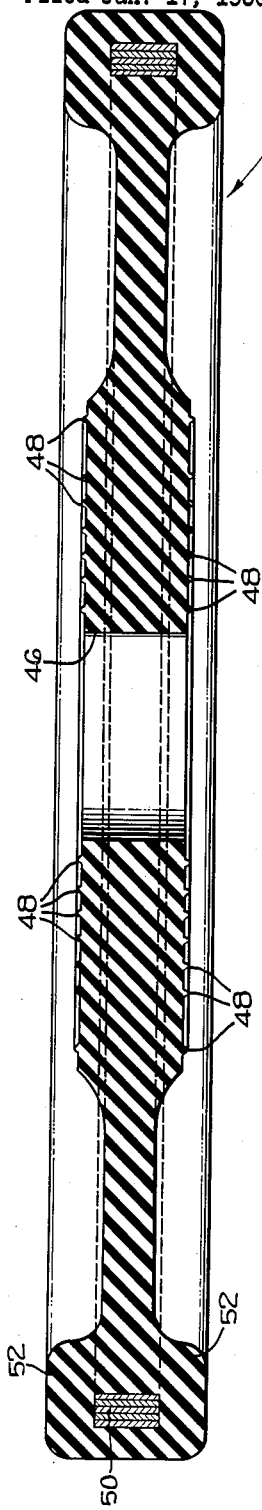
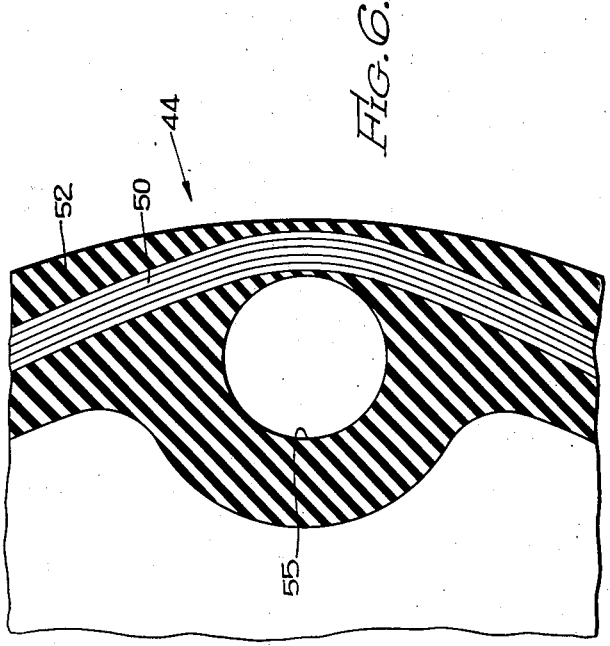
RAYMOND G. TAYLOR, JR.
INVENTOR.
BY
ATTORNEY

2,966,690

PERIPHERALLY STIFFENED PIPE WIPER

Raymond G. Taylor, Jr., Santa Monica, Calif., assignor to Borg-Warner Corporation, Chicago, Ill., a corporation of Illinois Filed Jan. 17, 1956, Ser. No. 559,662

8 Claims. (Cl. 15—210)

The present invention relates to an improved pipe wiper.

When drilling oil wells by means of the rotary drilling method, the drill pipe used becomes covered with well fluids, and it is necessary to provide suitable wiping means for the pipe when it is withdrawn from the well. It has become standard in the industry to do this by positioning a centrally apertured rubber wiper beneath the master bushing in the rotary table. Lifting of the pipe through the wiper causes the drilling fluid to be wiped off the pipe.

From the earliest use of such wipers, certain difficulties have been noted, and various improvements have been made. One difficulty has been that the wiping portion of the wiper has to be flexible enough to expand when a tool joint or drill pipe protector passes through it, but yet stiff enough to firmly envelop the pipe for a normal wiping action. These requirements are different from those of the peripheral portion of the wiper, which merely needs to be stiff enough to prevent pulling of the wiper up through the master bushing as the pipe is pulled through it. Two different rubber compositions have been tried for the central wiping portion and the peripheral portion respectively, but this has the disadvantage of causing separation and tearing to occur at the bonding face between the two rubber compositions.

Wipers have been made using the same rubber composition throughout, but which embody a single metal stiffener ring, or layers of stiffener fabric in the periphery. Although the basic idea of stiffening the peripheral portion of a wiper by embedding therein reinforcing material has proven advantageous, none of the specific stiffeners heretofore used has proven entirely satisfactory.

It may be generalized that a stiffener having optimum characteristics is one that will deflect a considerable amount laterally under normal handling, without taking a permanent set, and which also will have very high resistance to deflection under a force applied in the direction of the axis of the central opening in the wiper.

Resistance to axial force is necessary for several reasons. Primarily, it is necessary in order to prevent the wiper from being pulled up through the master bushing as the pipe passes through it. Also it is necessary that the stiffener be able to withstand great axial force without permanently deforming, because if the stiffener acquires a permanent twist, the contorted wiper will always be askew with respect to the drill pipe. Not only will the wiping action then be impaired, but also the unequal stresses set up will very quickly tear the rubber away from the stiffener and destroy the wiper.

After considerable experimental work, it has been found that an optimum stiffener is one that is formed from a band of resilient metal wound in a tight spiral. The metal band has a greater axial dimension than a lateral one, so that it will possess great rigidity in a direction axially of the wiper, but yet it can flex radially inwardly upon application of a lateral force. It has been found that a band 5/8" x 1/16" is satisfactory as a stiffener for the wipers disclosed herein.

By way of comparison, tests have been conducted to determine the relationship between applied lateral force and lateral deflection on continuous rings of circular cross-section, continuous bands of rectangular cross section, and on spirally wrapped bands. In each case the ring or band had a center line diameter of 16". Various lateral forces were applied and the deflections measured as set forth in Table I below.

TABLE I

*Lateral deflection*

[Inches across 16" diameter]

| Ring or Band Cross-Section | Deflection in Inches at Indicated Loads | | |
|---|---|---|---|
| | 25 lbs. | 50 lbs. | 100 lbs. |
| 3/16" Diameter Ring | .06 | .13 | .18 |
| 1/4" Diameter Ring | .08 | .19 | .28 |
| 7/16" Diameter Ring | .12 | .27 | .43 |
| 3/8" Diameter Ring | .21 | .40 | .67 |
| 5/16" Diameter Ring | .37 | .62 | 1.03 |
| 1/4" Diameter Ring | .65 | 1.00 | 1.90 |
| 3/16" Diameter Ring | 1.25 | 3.10 | |
| 1/8" Diameter Ring | 3.85 | | |
| 5/16" x 5/8" Band | .13 | .29 | .47 |
| 3/16" x 5/8" Band | .45 | .73 | 1.22 |
| (5 Wraps of 1/16" x 5/8" Band) | 1.65 | 2.95 | 7.6 |

It will be observed that as to the rings, the application of the same force caused a greater deflection as the diameter decreased. Also a greater force on any ring increased the lateral deflection. The 3/16" ring took a permanent deformation when between 50 and 100 lbs. were applied (about 70 lbs.). The 1/8" ring exceeded the elastic limit when between 25 and 50 lbs. were applied (about 35 lbs.).

The two continuous bands used were constructed so that the axial dimension of both was 5/8", and the lateral forces were applied normal to the 5/8" face.

The results indicate that deflection of the 5/16" x 5/8" band is equivalent to that of a ring somewhere between 3/8" and 7/16" in cross sectional diameter, and that the deflection of the 3/16" x 5/8" ring was equivalent to that of a ring somewhere between 1/4" and 5/16" in cross sectional diameter.

However, the most significant result of the tests relates to the performance of the stiffener formed from a band 1/16" x 5/8" wound in a five-wrap spiral. The lateral deflecting force was again applied normal to the 5/8" face of the band. The data obtained indicate that the five-wrap spiral was much more flexible than the rectangular band 5/16" x 5/8", which, of course, had the same total amount of cross sectional area. In fact, for loads up to 50 lbs., the spiral deformed about the same as the small diameter, very flexible 3/16" ring. It was far superior to the 5/16" ring, and for that matter to any of the other members tested, in that it deflected 7.6" under 100 lbs. of force, without exceeding its elastic limit. This characteristic of deflecting inwardly and absorbing lateral shocks without permanently deforming is most desirable as a stiffener for a pipe wiper. Taken together with its superior resistance to axially directed deflecting forces, the multi-wrap band provides an optimum stiffener.

Table II below lists calculated loads and axial deflections at the elastic limits of the rings and bands referred to above, when supported at two diametrically opposite points and subjected to axially directed loads applied at diametrically opposite points offset 90° from the points of support.

TABLE II

*Bending (folding) across diameter*

[Loads and deflections at elastic limit]

| Ring or Band Cross Section | Load (Lbs.) | Deflection (In.) |
| --- | --- | --- |
| 9/16" Diameter Ring | 647 | .403 |
| 1/2" Diameter Ring | 457 | .463 |
| 7/16" Diameter Ring | 310 | .526 |
| 3/8" Diameter Ring | 193 | .606 |
| 5/16" Diameter Ring | 110 | .721 |
| 1/4" Diameter Ring | 57 | .906 |
| 3/16" Diameter Ring | 24 | 1.207 |
| 1/8" Diameter Ring | 7 | 1.810 |
| 9/16" x 5/8" Band | 758 | .363 |
| 3/16" x 5/8" Band | 533 | .434 |
| 5 Wraps of 1/16" x 5/8" Band | 758 | .363 |

It is seen from Table II that as the diameter of a ring decreases, a smaller load is required to stress the ring up to its elastic limit, and that the deflection at the elastic limit is greater for the smaller rings. As to the bands, it will be observed that the performance of a multi-wrap stiffener under influence of a folding force would be about the same as that of a solid band having the same total cross-sectional area. However, the multi-wrap band is, of course, far superior to the circular rings and the solid bands in that the latter two stiffener types cannot readily deform inwardly under the influence of lateral forces without exceeding their elastic limits.

By way of note, it could be said that a stiffener could be formed from a loosely wrapped spiral (e.g. with 1/2" between wraps), or from a plurality of individual bands of diminishing diameter and nested within each other. Either of these stiffeners would have good resistance to axial bending forces, but would tend to be limited by the characteristics of the outermost band as far as resistance to lateral squeezing forces would be concerned. Although the rubber of the wiper would transmit the force between successive bands, and help unify their action, there would be a tendency for the outermost band to take a permanent set under a relatively low lateral force. Likewise, a stiffener formed from a plurality of identical rings or bands stacked upon each other axially might have good resistance to axial bending, but would not have such desirable characteristics insofar as resistance to lateral force is concerned. The unique effect of a multi-wrap member which can, to a degree, wind and unwind would be lost.

It should be understood that the actual forces required and the deflections obtained in a pipe wiper with an embedded stiffener member would vary somewhat from those listed above, because of the presence of the rubber of the wiper. The resistance of the rubber to deformation would tend to increase the forces required to obtain the same deformations. The figures set forth above should be considered as being only comparative of reaction characteristics of stiffeners of different types and varying dimensions, but they illustrate the striking difference between the various stiffener members which can be used.

Spiral stiffener bands may be used in wipers of varied configuration. As disclosed in the accompanying drawings, two wipers are shown. In a preferred embodiment, the stiffeners are used in a tandem wiper the two halves of which are held at a fixed distance from each other by peripheral webs. The spiral bands, which are embedded in the peripheral portions of the wipers, strengthen each wiper, and are also effective to create a composite beam which gives the tandem wiper still greater resistance to axial bending forces.

In a second embodiment a spiral stiffener band is carried in the periphery of a single wiper, which is oval shaped. The stiffener band is prestressed to an oval shape; then it is set within the mold in which the wiper is cured. A primary advantage of the oval wiper is that it has a relatively long major diameter and a relatively short minor diameter at right angles thereto. As a result, the wiper may be tilted about its minor axis, inserted downwardly through a solid type master bushing, and then returned to horizontal position so that the long portion of the wiper will engage the underside of the master bushing. (It will be understood that when a solid type master bushing is used, the procedure used in installing a pipe wiper below a split or hinged master bushing cannot be employed.)

When it is desired to remove the oval wiper, it is again tilted about its minor axis and pulled out of the master bushing. As an aid in removing the wiper, two holes are molded into the wiper along the major diameter, and a hook can be inserted into one of them to tilt the wiper prior to pulling it up through the master bushing.

Another advantage of the oval wiper is that it makes for greater accommodation of an enlargement on the pipe being pulled through the wiper. The prestressed oval stiffener tends to allow more adjustment since it yields easily along its minor diameter.

Accordingly, it is an object of the invention to provide a pipe wiper which may flex radially inwardly relatively easily upon application of a transverse force, but which has a high resistance to flexure as a result of the application of an axially directed bending force.

It is another object of the invention to provide a pipe wiper having a stiffener in its periphery which permits the wiper to flex radially inwardly upon application of a transverse force, but which stiffens the wiper so that relatively little flexing occurs upon the application of an axially directed bending force of considerable magnitude.

It is a still further object of the invention to provide a stiffener for a wiper which consists of several wraps of a flat metal band embedded in the periphery of the wiper.

It is a still further object of the invention to provide a tandem-type wiper, the two sections of which each contains a peripheral stiffener consisting of a metal band wound in a spiral.

It is a still further object of the invention to provide an oval shaped pipe wiper with a stiffener embedded within its periphery which imparts high resistance to an axial bending force, but which will flex relatively easily upon application of a force radially inwardly or outwardly.

It is a still further object of the invention to provide a wiper having an oval shape and a stiffener embedded within its periphery and consisting of a metal band wrapped in a spiral.

Turning now to the drawings:

Figure 1 is a perspective illustration of a preferred form of the invention.

Figure 2 is a cross-sectional view of the wiper of Figure 1, taken along the line 2—2 of Figure 1.

Figure 4 is a plan view of a second embodiment of the invention.

Figure 5 is a sectional view taken along the shorter diameter 5—5 of the wiper of Figure 4.

Figure 6 is a broken sectional view of the wiper of Figure 4, and illustrating in greater detail the spiral wrapped stiffener molded within the periphery of the wiper.

Figure 3:
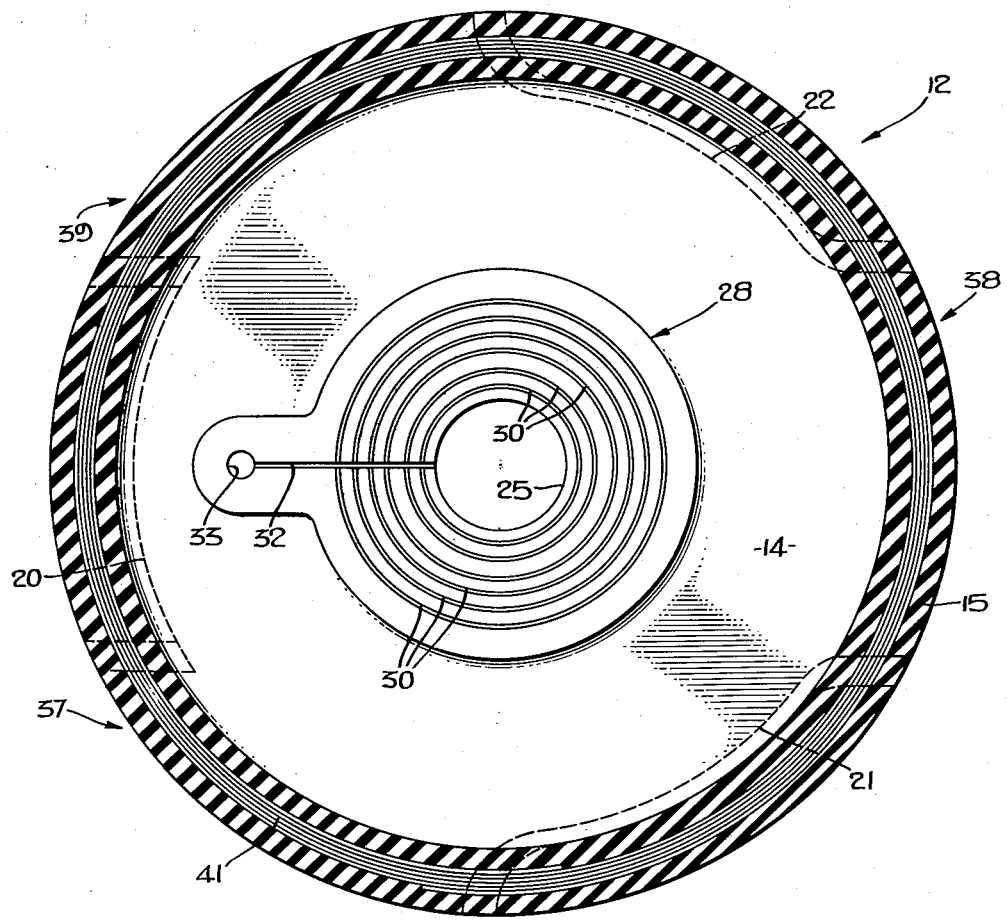
Figure 3 is a cross-sectional view of the wiper, taken along the line 3—3 of Figure 2.

In the preferred embodiment illustrated in Figures 1, 2, and 3, there is illustrated a tandem-type wiper. The tandem wiper comprises an upper wiping member 12 and a lower wiping member 13. Except for the stiffeners described below, both members are formed from rubber-like material. The upper member 12 has a central wiping portion 14 and a peripheral portion 15. The lower member 13 has a central wiping portion 17 and a peripheral portion 18. The entire wiper is molded as a complete unit; the upper and lower members 12 and 13 are held at a fixed distance from each other by means of the webs 20, 21, and 22, which are continuous with the peripheral portions 15 and 18.

Both wiper members have central openings, as at 25 and 26 through which the drill pipe to be wiped may be passed. Both wiper members have raised areas around their central openings. The raised area 28 on wiper member 12 is best shown in Figures 1 and 3. This raised area is marked off by a series of concentric ridges 30. Each ridge has a diameter corresponding to a standard size drill pipe in use today. The wiper members can therefore be cut along any desired ridge so that the central holes 25 and 26 will accommodate the particular size drill pipe being used. A radial split 32, is provided so that the wiper members can expand without tearing, to allow passage of tool joints, pipe protectors, or other enlargements associated with the drill pipe. In the illustrated embodiment, the split 32 extends axially of the wiper, but it is to be understood that the splits may, if desired, be disposed on oblique planes. Hole 33 is provided since it tends to prevent the wiper from tearing beyond the split 32. The two wiper members 12 and 13 are identical so that the wiper is completely reversible. However, as put together to form the complete wiper, the splits 32 extend in diametrically opposite directions so that an even, balanced wiping effect will be produced.

Between the two wiping members there is formed a mud collecting chamber 35. The mud that is collected in this chamber may flow out through the exit passages 37, 38, and 39. As shown in Figure 3, passage 38 has a slightly different appearance than do passages 37 and 39, because of the way in which cores are placed in the wiper mold.

Within the peripheral portions 15 and 18 of the wiper members 12 and 13 respectively there are carried the stiffener members 41 and 42. As illustrated in Figures 2 and 3, each stiffener consists of a spring steel band wrapped upon itself in the form of a tight spiral. Viewed at its cross-section, as in Figure 2, the stiffener is formed as a composite unit formed of laminae each having a much greater axial dimension than a lateral one. The stiffener is, therefore, very much more resistant to axial flexing than to lateral flexing. Still further, since the individual wraps may wind or unwind to an extent upon application of a lateral force, there is no undue tearing of the rubber away from the metal at the axial bonding surfaces when a lateral force is applied.

It will also be seen that the presence of the two stiffener members 41 and 42 tends to create a beam in the periphery of the wiper, having additional resistance to axial folding. This beam presents a composite member which will not deform upon the application of normal axial forces, and which can adjust and return to its initial set after the application of lateral forces.

The embodiment of Figures 4, 5, and 6, is generally similar to the embodiment of Figures 1 through 3 except that it is a single wiper and of oval configuration. This wiper 44, has a central opening 46 through which the string of drill pipe is pulled. The annular ridges 48 are provided so that the rubber may be cut and the hole 46 enlarged if necessary. The stiffener member 50 is carried in the peripheral portion 52 of the wiper. It is pre-stressed to conform to the generally oval configuration of the wiper. The stiffener consists of a band of spring steel wound upon itself, in generally spiral form.

The oval configuration has a special advantage in that the wiper may be set in place down through a solid type master bushing, without lifting the bushing out of the rotary table. To do this, the wiper is first tilted about its minor diameter, then it is squeezed and inserted down through thte master bushing. Once it is below the bushing, it may be tilted back so that it will engage the under side of the bushing at its major diameter. Being set this way, it will stay in place as drill pipe is pulled up through it. At such time as it is to be lifted back up through the master bushing, the pipe and the wiper on it are lowered slightly so that a hook can be inserted into one of the holes 54, or 55. The wiper may then be tilted about its minor diameter by pulling on the hook. After the wiper is tilted it is easily pulled back up through the master bushing.

It will be noted that the plural wrapped stiffener band is particularly suitable for the oval shaped wiper. Not only will it satisfactorily resist any axial folding forces, but also it will readily deflect inwardly along its minor diameter to allow the wiper to squeeze through a solid master bushing of restricted size. Additionally, since it is especially flexible along its minor diameter it will easily adjust to forces applied radially outwardly.

It will be appreciated that various modifications of the invention will be suggested to one skilled in the art. For example, it is possible to use a multi-wrap stiffener in a one piece wiper which is circular instead of oval. If it would be desirable, other materials besides metal, such as certain plastics, could be used for the stiffener. Also, the number of wraps can be varied to obtain desirable results. These and other modifications are considered to be within the true scope of the invention as set forth in the following claims.

What is claimed is:

1. A pipe wiper comprising a body of rubber-like material having a central, relatively flexible wiping portion having a pipe opening therethrough, and an outer peripheral portion, a stiffener embedded within said peripheral portion, said stiffener consisting of a band rectangular in cross section, and wound upon itself in a plurality of wraps, said band having a greater dimension axially of the wiper than its dimension laterally of the wiper so that the stiffener has a greater resistance to axial flexing than to transverse flexing.

2. A pipe wiper comprising a body of rubber-like material having a central, relatively flexible wiping portion having a pipe opening therethrough, and an outer peripheral portion, a stiffener embedded within said peripheral portion, said stiffener comprising a rectangular metal band having a greater dimension axially of the wiper than its dimension laterally of the wiper so that the stiffener has a greater resistance to axial flexing than to transverse flexing, said band being continuous about the periphery of said body and being composed of metal having the ability to recover from substantial deformation due to transverse flexing of said band.

3. A pipe wiper comprising a body of rubber-like material having a central, relatively flexible wiping portion having a pipe opening therethrough, and an outer peripheral portion, a stiffener embedded within said peripheral portion, the stiffener comprising a metal band formed in a number of circumferential stiffening winding held immediately adjacent each other, said band having a greater dimension axially of the wiper than its dimension laterally of the wiper so that the stiffener has a greater resistance to axial flexing than to transverse flexing.

4. A pipe wiper comprising a pair of complementary wiper members held at a fixed distance from each other by means of at least one spacer web, each of said wiper members comprising a body of rubber-like material having a central, relatively flexible wiping portion having a central pipe opening therethrough, and a peripheral portion, a stiffener embedded within the peripheral portion of each wiping member, each stiffener consisting of a metal band wound in a tight spiral, said band having a greater dimension axially of the wiper than its dimension laterally of the wiper so that the stiffener has a greater resistance to axial flexing than to transverse flexing, one stiffener being carried immediately above the other so that the periphery of the wiper forms a beam having very high resistance to axial flexing but which will deflect radially inwardly relatively easily upon the application of a lateral force.

5. A wiper comprising a body of rubber-like material having a central, relatively flexible wiping portion having an initial pipe opening therethrough, and an oval shaped peripheral portion, an oval shaped stiffener embedded within said peripheral portion, said stiffener comprising a number of rectangular in cross section circumferential stiffening laminae held adjacent each other, each lamina having a greater dimension actually of the wiper than its dimension laterally of the wiper so that the stiffener has a greater resistance to actual flexing than to transverse flexing, the wiper having a major diameter and a minor diameter at right angles thereto, the wiper being capable of deflecting radially relatively easily upon application of a lateral force applied in the direction of its minor diameter, and having relatively greater resistance to radial deflection upon application of a lateral force applied along its major diameter.

6. A wiper comprising a pair of complementary wiper members held at a fixed distance from each other by means of at least one spacer web, each of said wiper members comprising a body of rubber-like material having a central, relatively flexible wiping portion having a central pipe opening therethrough, and a peripheral portion, a stiffener embedded within said peripheral portion, the stiffener comprising a number of circumferential stiffening laminae disposed immediately adjacent each other, said band having a greater dimension axially of the wiper than its dimension laterally of the wiper so that the stiffener has a greater resistance to axial flexing than to transverse flexing.

7. A pipe wiper comprising a pair of complementary wiper members held at a fixed distance from each other by means of at least one spacer web, each of said wiper members comprising a body of rubber-like material having a central, relatively flexible wiping portion having a central pipe opening therethrough, and a peripheral portion, a stiffener embedded within said peripheral portion, said stiffener comprising a band wound in a number of circumferential stiffening windings disposed adjacent each other, said band having a greater dimension axially of the wiper than its dimension laterally of the wiper so that the stiffener has a greater resistance to axial flexing than to transverse flexing.

8. A pipe wiper comprising a pair of complementary wiper members held at a fixed distance from each other by means of at least one spacer web, each of said wiper members comprising a body of rubber-like material having a central, relatively flexible wiping portion, and a peripheral portion, a stiffener embedded within said peripheral portion, said stiffener consisting of a member having a cross-sectional configuration with a greater dimension axially of the wiper than its dimension lateral to the wiper so that the stiffener has a greater resistance to axial flexing than to transverse flexing, said member being wound upon itself in a tight spiral.

References Cited in the file of this patent

UNITED STATES PATENTS

| | | |
|---|---|---|
| 1,513,434 | Sloper | Oct. 28, 1924 |
| 2,392,146 | Hall | Jan. 1, 1946 |
| 2,444,653 | Kennedy et al. | July 6, 1948 |
| 2,514,817 | Wheaton et al. | July 11, 1950 |
| 2,620,504 | Slater | Dec. 9, 1952 |
| 2,866,217 | Dean | Dec. 30, 1958 |

UNITED STATES PATENT OFFICE
CERTIFICATE OF CORRECTION

Patent No. 2,966,690                      January 3, 1961

Raymond G. Taylor, Jr.

It is hereby certified that error appears in the above numbered patent requiring correction and that the said Letters Patent should read as corrected below.

Column 6, line 73, for "initial" read -- central --; column 7, line 3, for "actually" read -- axially --.

Signed and sealed this 3rd day of December 1963.

(SEAL)
Attest:
ERNEST W. SWIDER

Attesting Officer

EDWIN L. REYNOLDS

Acting Commissioner of Patents